United States Patent
Kløvning

(10) Patent No.: US 7,497,128 B2
(45) Date of Patent: Mar. 3, 2009

(54) POWER METER FOR MEASURING AND CALCULATION OF FORCES ON BODIES

(75) Inventor: Bjarne Kløvning, Hareid (NO)

(73) Assignee: FM Equipment AS, Nessetfeltet (NO)

( * ) Notice: Subject to any disclaimer, the term of this patent is extended or adjusted under 35 U.S.C. 154(b) by 0 days.

(21) Appl. No.: 11/556,238

(22) Filed: Nov. 3, 2006

(65) Prior Publication Data

US 2007/0151372 A1    Jul. 5, 2007

Related U.S. Application Data

(63) Continuation of application No. PCT/NO2005/000148, filed on May 4, 2005.

(51) Int. Cl.
 *G01B 5/30* (2006.01)
(52) U.S. Cl. ....................................................... 73/760
(58) Field of Classification Search ............ 73/760–856
 See application file for complete search history.

(56) References Cited

U.S. PATENT DOCUMENTS

| | | | |
|---|---|---|---|
| 4,430,895 A | | 2/1984 | Colton |
| 4,492,949 A | * | 1/1985 | Peterson et al. ............ 338/114 |
| 4,733,736 A | * | 3/1988 | Holtgreven et al. ......... 177/255 |
| 4,899,599 A | * | 2/1990 | Eddens ................... 73/862.382 |
| 4,912,990 A | * | 4/1990 | Norling ..................... 73/862.59 |
| 5,199,519 A | * | 4/1993 | Polaert et al. ............... 177/211 |
| 5,269,187 A | | 12/1993 | Hanson |
| 5,367,217 A | * | 11/1994 | Norling ...................... 310/370 |
| 6,002,091 A | * | 12/1999 | Reneau ................ 200/61.45 M |
| 6,374,682 B1 | | 4/2002 | Burkhard et al. |
| 7,283,215 B2 | * | 10/2007 | Wang et al. .................... 356/28 |

FOREIGN PATENT DOCUMENTS

| | | |
|---|---|---|
| EP | 0793102 A2 | 9/1997 |
| GB | 1336223 A | 11/1973 |
| JP | 2000-137038 A | 5/2000 |
| WO | WO 03/070504 A1 | 8/2003 |

\* cited by examiner

*Primary Examiner*—Max Noori
(74) *Attorney, Agent, or Firm*—Stuart R. Hemphill; Dorsey & Whitney LLP

(57) ABSTRACT

A three-dimensional power meter for measurement and calculation of forces on bodies, accelerating and retarding forces for bodies moving with varying speeds and ascending angles both on the ground and in the air is described. The three-dimensional power meter includes a linear housing (A1) with two through-going parallel axles (B1, B2) and two traverses (C1, C2), a regulator (E1) for variation of engine power which is connected to a feather weight (F1), as well as power cells (F2, F3) for measurement of both accelerating and retarding power.

12 Claims, 5 Drawing Sheets

PLAN

Fig.3
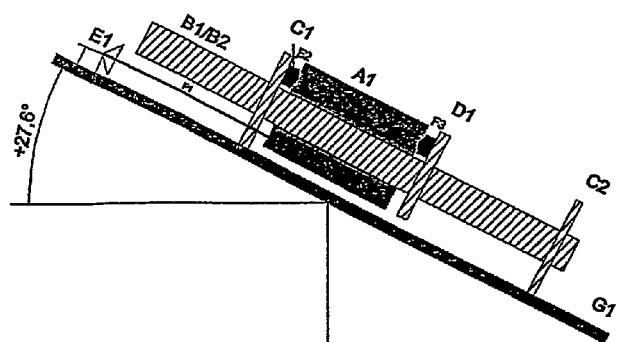
I.
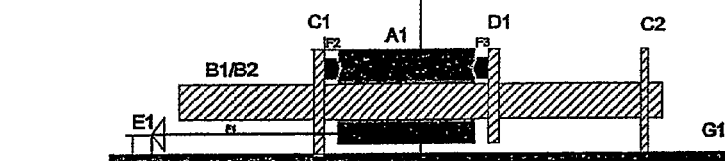
0 degrees = curvature of the earth surface
II.
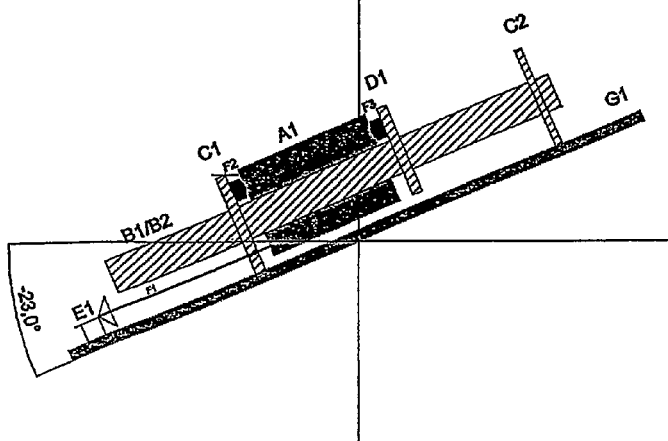
III.

Fig.4

Mass = 25kg

| Dimension 1 | Dimension 2 | Dimension 3 | Dimension 4 | Gradient angle | Remark |
|---|---|---|---|---|---|
| Motor F1 | Accelerating F2 | Retarding F3 | Counterforce F4 | Degree (360) | |
| Measured power | Measured power | Measured power | Calculated power | Measured angle | |
| 9 kp | 9 kp | 0 kp | F1-F2=0 kp | 0 | |
| 9 kp | 7 kp | 0 kp | F1-F2=2 kp | 5 | Tenable condition for F1 |
| 9 kp | 4,7 kp | 0 kp | F1-F2=4,3 kp | 10 | |
| 9 kp | 2,5 kp | 0 kp | F1-F2=6,5 kp | 15 | |
| 9 kp | 0,2 kp | 0 kp | F1-F2=8,8 kp | 20 | |
| 9 kp | 0 kp | 0 kp | F1-F2-F3=9 kp | 20,3 | =Force balance condition |
| 9 kp | 0 kp | 1 kp | F1+F3=10 kp | 25 | Force balance condition exceeded |
| 9 kp | 0 kp | 3 kp | F1+F3=12 kp | 30 | Untenable condition for F1. |
| 9 kp | 0 kp | 5 kp | F1+F3=14 kp | 35 | |
| 9 kp | 0 kp | 7 kp | F1+F3=16 kp | 40 | |

| Dimension 1 | Dimension 2 | Dimension 3 | Dimension 4 | Gradient angle | Remark |
|---|---|---|---|---|---|
| Motor F1 | Accelerating F2 | Retarding F3 | Counterforce F4 | Degree (360) | |
| Measured power | Measured power | Measured power | Calculated power | Measured angle | |
| 9 kp | 9 kp | 0 kp | F1-F2=0 kp | 0 | |
| 9 kp | 11,4 kp | 0 kp | 0 | -5 | |
| 9 kp | 14,0 kp | 0 kp | 0 | -10 | |
| 9 kp | 15,9 kp | 0 kp | 0 | -15 | |
| 9 kp | 18,3 kp | 0 kp | 0 | -20 | Tenable condition for F1 |
| 9 kp | 20,3 kp | 0 kp | 0 | -25 | |
| 9 kp | 22,6 kp | 0 kp | 0 | -30 | |
| 9 kp | 24,4 kp | 0 kp | 0 | -35 | |
| 9 kp | 26,6 kp | 0 kp | 0 | -40 | |

Engine power pr. kg Mass = 0,36kp/kg (9kp/25kg)

Fig.5 mass = 40kg

| Dimension 1 | Dimension 2 | Dimension 3 | Dimension 4 | Gradient angle | Remark |
|---|---|---|---|---|---|
| Motor F1 | Accelerating F2 | Retarding F3 | Counterforce F4 | Degree (360) | |
| Measured power | Measured power | Measured power | Calculated power | Measured angle | |
| 9 kp | 9 kp | 0 kp | F1-F2=0 kp | 0 | |
| 9 kp | 5,9 kp | 0 kp | F1-F2=3,1 kp | 5 | Tenable condition for F1 |
| 9 kp | 2,3 kp | 0 kp | F1-F2=6,7 kp | 10 | |
| 9 kp | 0 kp | 0 kp | F1-F2-F3=9 kp | 13,4 | =Force balance condition |
| 9 kp | 0 kp | 1 kp | F1+F3=10 kp | 15 | Force balance condition exceeded |
| 9 kp | 0 kp | 4 kp | F1+F3=13 kp | 20 | Untenable condition for F1. |
| 9 kp | 0 kp | 7 kp | F1+F3=16 kp | 25 | |
| 9 kp | 0 kp | 10 kp | F1+F3=19 kp | 30 | |
| 9 kp | 0 kp | 12 kp | F1+F3=21 kp | 35 | |
| 9 kp | 0 kp | 14 kp | F1+F3=23 kp | 40 | |

| Dimension 1 | Dimension 2 | Dimension 3 | Dimension 4 | Gradient angle | Remark |
|---|---|---|---|---|---|
| Motor F1 | Accelerating F2 | Retarding F3 | Counterforce F4 | Degree (360) | |
| Measured power | Measured power | Measured power | Calculated power | Measured angle | |
| 9 kp | 9 kp | 0 kp | F1-F2=0 kp | 0 | |
| 9 kp | 12,5 kp | 0 kp | 0 | -5 | |
| 9 kp | 16,7 kp | 0 kp | 0 | -10 | |
| 9 kp | 19,7 kp | 0 kp | 0 | -15 | |
| 9 kp | 23,8 kp | 0 kp | 0 | -20 | Tenable condition for F1 |
| 9 kp | 26,3 kp | 0 kp | 0 | -25 | |
| 9 kp | 29,8 kp | 0 kp | 0 | -30 | |
| 9 kp | 33,4 kp | 0 kp | 0 | -35 | |
| 9 kp | 36,2 kp | 0 kp | 0 | -40 | |

Engine power pr. kg mass = 0,225kp/kg (9kp/40kg)

POWER METER FOR MEASURING AND CALCULATION OF FORCES ON BODIES

CROSS-REFERENCE TO RELATED APPLICATION(S)

This application is a continuation of International Application No. PCT/NO2005/000148, filed on May 4, 2005, which claims priority to Norwegian Application No. 20041830, filed on May 4, 2004, the contents of which are incorporated in their entirety by reference herein.

The present invention concerns a measuring device, i.e. a three-dimensional power meter for measuring and calculating of forces on bodies.

More specifically the invention is directed to a three-dimensional power meter to measure accelerating and retarding forces for bodies moving with varying speed and gradient angles, both on the ground and in the air. The device can measure forces in three dimensions.

The three-dimensional power meter may have several ranges of application, but may first of all be of aid in connection with training of air pilots. By scaling the three-dimensional power meter it may be built as a simulator, which by means of hydraulics can control the angles gradually, and thus obtain the forces that are generated during different conditions.

It is also possible to insert forces from different engines and simulate engine failure, e.g. in an engine. The simulator may immediately indicate which procedure to be initiated.

It may also be possible to build the three-dimensional power meter into the engine of the aircrafts. The pilot will then take the control of the forces of the engine, and may provide a safe gradient angle (slope). This may increase the flight safety.

By means of minor adjustments and scaling the three-dimensional power meter can be used in connection with brake checking of heavy and light vehicles. This may further promote the safety on the roads.

The measuring technique may generally be utilized in all connections where linear forces can be estimated. The measuring device according to the invention is not limited to a specific area of application, but can be used within a number of fields.

JP 2000 137038A describes a detector in an acceleration sensor that can record forces in two directions, accelerating and retarding forces as a function of movement of masses.

U.S. Pat. No. 6,374,682B1 concerns a device that can record forces in two dimensions, accelerating and retarding forces as a function of movement of masses.

EP 07933102A2 concerns a seismic sensor device that can record forces in two dimensions, accelerating and retarding forces as a function of movement of masses.

GB 1336223A describes a deceleration device in vehicles that can record forces in one dimension, decelerating forces as a function of movement of masses.

BRIEF DESCRIPTION OF THE DRAWINGS

The invention may be further explained with reference to the drawings.

FIG. 3 shows in part I the three-dimensional power meter of an angle 27.6° in relation to the horizontal plane, part II shows the three-dimensional power meter parallel to the horizontal plane, and part III shows the three-dimensional power meter of an angle −23°.

FIG. 4 shows measuring data of various angle experiments with the mass 25 kg.

FIG. 5 shows measuring data of various angle experiments with the mass 40 kg.

DETAILED DESCRIPTION OF THE DRAWINGS

Figure 1:
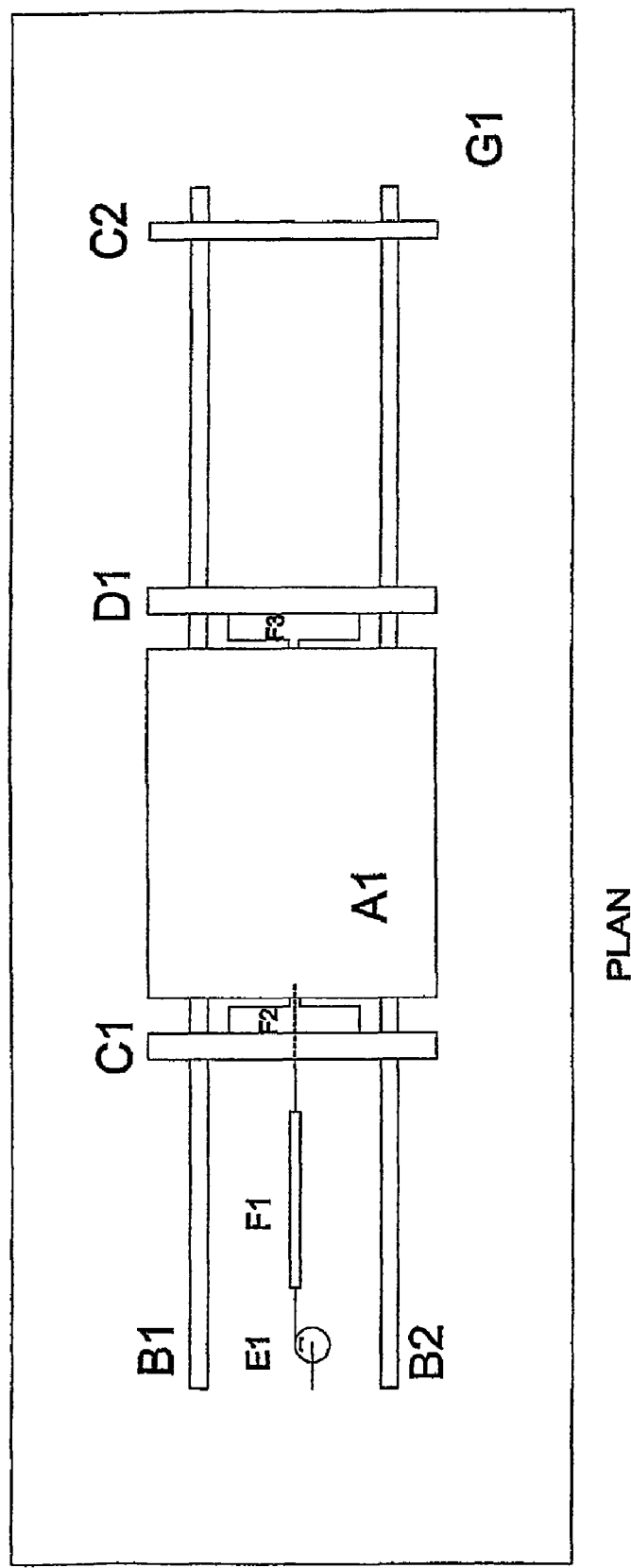
FIG. 1 shows the assembly diagram for components of the three-dimensional power meter according to the invention.
Figure 2:
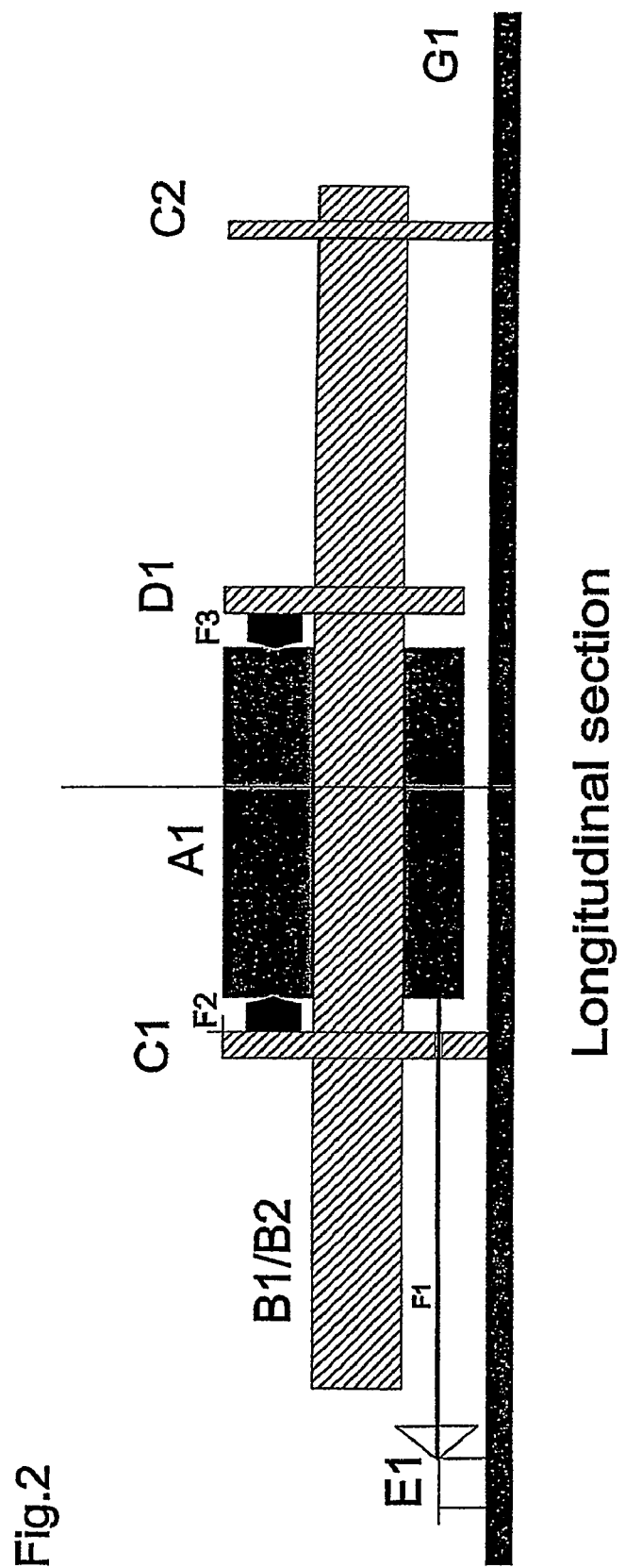
FIG. 2 shows a front outline/longitudinal section of the three-dimensional power meter.

The three-dimensional power meter is shown in FIG. 1 as an assembly diagram for components and in FIG. 2 as a longitudinal section. The three-dimensional power meter consists of an underlying mounting plate G1 to which the three-dimensional power meter is secured. A bearing house A1 preferably with two shafts through linear bearing B1 and B2. The shafts B1 and B2 are parallel through the linear bearings in the bearing house. Two traverse (crossarms) C1 and C2 on each side of the linear bearing are secured to the mounting plate G1, preferably screwed on. The two shafts B1 and B2 are each fastened in the traverse. A further traverse D1 is adjustable and is arranged between the linear bearing A1 and one of the fixed traverse C2.

A regulator E1 for variation of engine power is arranged between the shafts B1 and B2 and secured to the mounting plate G1. A spring balance F1 is on one side fastened to the regulator E1, and on the other side to the bearing house A1. The spring balance F1 is extending through a suitable hole in the traverse C1.

An electronic power cell (thrust) F2 is secured to the traverse C1 on one side of the bearing house A1. The electronic power cell F2 can measure the accelerating forces.

On the other side of the bearing house A1 another electronic power cell (thrust) F3 is secured to the adjustable traverse D1. This power cell can measure the retarding forces.

These power cells measuring accelerating or retarding forces are of conventional type appropriate for this kind of measurements.

By means of this equipment is it possible in an accurate and reliable way to measure the forces that generate during different conditions and angles.

FIG. 3 shows the measuring device used in different angles in relation to the horizontal plane. In part I of the figure the measuring device has an angle +27.6° in relation to the horizontal plane, in part II the angle is equal to 0, and in part III the angle is −23.0° in relation to the horizontal plane.

FIG. 4 depicts the results of measurements with the three-dimensional power meter according to the invention for a mass below 25 kg with different gradient angles (slopes).

FIG. 5 depicts the results of measurements with the three-dimensional power meter according to the invention for a mass of 40 kg with different gradient angles.

The measurements depicted in FIGS. 4 and 5 are a function of only engine power and the gravity parallel forces. The air resistance may first assert when the body achieves a velocity.

The invention claimed is:

1. A three-dimensional meter comprising,
   a bearing house and a first shaft wherein the first shaft passes through a bearing in the bearing house;
   a first and a second traverse wherein the first shaft is fixedly connected to both the first and second traverse;
   a first cell configured to sense an acceleration force;
   a second cell configured to sense a retardation force; and
   a spring balance connected at a first end to a regulator and at a second end to the bearing house, wherein the spring balance passes through a hole in at least the first traverse.

2. The meter of claim 1 further comprising a third traverse adjustable along the first shaft.

3. The meter of claim 2 further comprising a mounting plate for arrangement of the meter.

4. The meter of claim 2 wherein the first cell is secured to the first traverse and the second cell is secured to the third traverse.

5. The meter of claim 1, wherein the first and second cells are electronic.

6. The meter of claim 1, further comprising a second shaft, parallel to the first shaft, passing through a bearing in the bearing house and fixedly connected to the first and second traverse.

7. The meter of claim 6 wherein the bearing house is a slidable mass.

8. The meter of claim 7 wherein the first and second traverse comprise a first and a second cross arm.

9. The meter of claim 8 further comprising a third cross arm adjustable along the two parallel shafts.

10. The meter of claim 9 wherein the first cell is fixedly attached to the first cross arm.

11. The meter of claim 10 wherein the second cell is fixedly attached to the third cross arm.

12. The meter of claim 10 wherein the first and second cells are electronic.

* * * * *

UNITED STATES PATENT AND TRADEMARK OFFICE
CERTIFICATE OF CORRECTION

PATENT NO. : 7,497,128 B2  
APPLICATION NO. : 11/556238  
DATED : March 3, 2009  
INVENTOR(S) : Bjarne Klovning Page 1 of 1

It is certified that error appears in the above-identified patent and that said Letters Patent is hereby corrected as shown below:

TITLE PAGE

| Item | Heading | Should Read |
|------|---------|-------------|
| (30) | Foreign Application Priority Data | -- May 4, 2004 (NO) ............. 2004 1830 -- |

Signed and Sealed this

Sixteenth Day of June, 2009

JOHN DOLL  
*Acting Director of the United States Patent and Trademark Office*